H. L. JOHNSTON.
PROCESS OF MAKING GEAR BLANKS AND THE LIKE.
APPLICATION FILED JAN. 7, 1915.
1,173,433.
Patented Feb. 29, 1916.
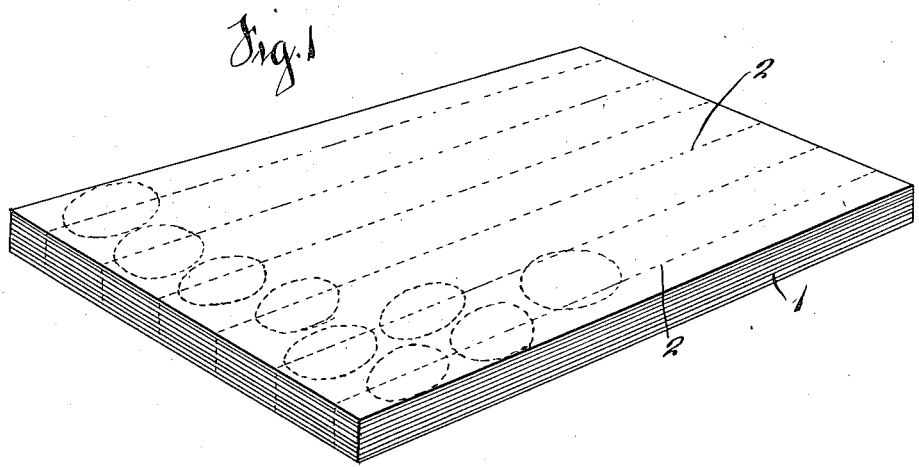
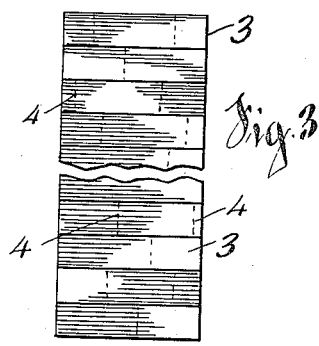
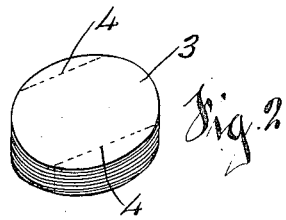
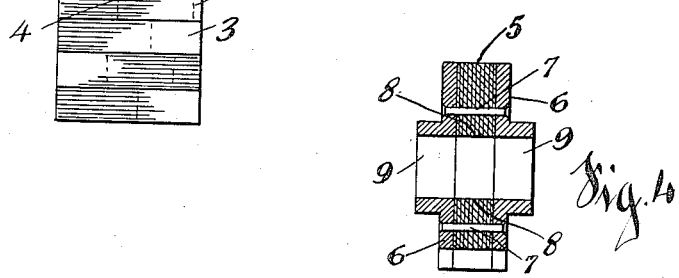

UNITED STATES PATENT OFFICE.

HERBERT L. JOHNSTON, OF TROY, OHIO, ASSIGNOR TO THE HOBART MANUFACTURING COMPANY, OF TROY, OHIO, A CORPORATION OF OHIO.

PROCESS OF MAKING GEAR-BLANKS AND THE LIKE.

1,173,433. Specification of Letters Patent. Patented Feb. 29, 1916.

Application filed January 7, 1915. Serial No. 915.

*To all whom it may concern:*

Be it known that I, HERBERT L. JOHNSTON, a citizen of the United States, and a resident of the city of Troy, in the county of Miami and State of Ohio, have invented certain new and useful Improvements in the Process of Making Gear-Blanks and the like, of which the following is a full, clear, and exact description, reference being had to the accompanying drawings, forming part of this specification.

It is old in the art to make gear wheels out of laminations or layers of various fabrics compressed into a solid sheet under powerful pressure, and in this connection gears have been manufactured from thin textile material built up of layers of the cloth and compressed to the desired degree of hardness. It is usual in carrying out this process to cut the material into disks of the desired diameter, then to build up one at a time a pile of the disks and submit the pile to the requisite pressure. It is quite essential in superimposing the blanks of the thin cloth that each blank should lie smooth and unwrinkled; otherwise when compressed the material will not be uniformly distributed in the finished product. The work of superimposing the blanks one at a time is necessarily slow and tedious, and even with care wrinkles and folds are apt to occur. It is to overcome these difficulties and to provide an expeditious and satisfactory process for arranging the blanks and to hold them in their arranged position until subjected to pressure, that my invention is directed, as will be hereinafter particularly pointed out and claimed.

In the drawings, Figure 1 is a perspective view of the material superimposed in layers from which the blanks are cut. Fig. 2 is a perspective view of one of the disks composed of a number of layers before being subjected to pressure. Fig. 3 is a central section of a number of the disks as arranged for compression. Fig. 4 is a perspective view with the cloth layers compressed and ready for the cutting of the gear teeth.

The fabric which may be of any suitable cloth or material, either of spinnable textile fabrics or felted material, is cut into strips of any suitable length and width and piled together into a pile 1. The layers of the cloth are then stitched together by a line of stitches 2, run in approximately parallel lines, and of a distance apart less than the diameter of the disks which are to be cut therefrom. The superimposed layers of the cloth thus held together are subjected to the stroke of disk cutters in a suitable press, either a series of cutters, or one cutter at a time, and disks 3 are cut from the pile as close together as practicable, in order to not waste the material. As the lines of stitching are spaced apart less than the diameter of the disks, for every disk cut there will be a line of stitches 4 across the disk and holding together in fixed and smooth relation to each other all of the layers making up the disk. Then the disks are arranged together in piles and subjected to powerful pressure and the material compressed to a hard bonelike structure 5 of the thickness of the gear to be cut therefrom. The metal hub plates 6, 6, are then located in place and riveted by rivets 7, 7, and the central hole 8 drilled in line with the openings 9 in the hub plates. The blank is then ready for the cutting of the gear teeth.

As illustrative of the degree of compression, I might add that for the manufacture of a gear one half an inch in thickness, the original layers of the textile fabric comprise about twenty sheets, and each disk before compression is about for this number of sheets a quarter of an inch thick. The compression of each disk reduces it to about one-thirty-second of an inch thick, so that to form a gear half an inch thick would take sixteen of the disks. Of course it will be understood that these figures and dimensions are only given for illustrative purposes.

Having thus described my invention, what I claim as new and desire to secure by Letters Patent, is:—

The process of making gear blanks from textile and felted fabrics, which consists in superimposing strips of convenient length and width in piles, then binding the layers together with lines of stitching spaced apart less than the diameter of the gear blank, and
5 cutting out the blank of a plurality of layers in one operation, then superimposing a plurality of blanks and compressing them into a single gear blank.

HERBERT L. JOHNSTON.

Attest:
 J. M. Ross,
 R. W. Deedeese.